United States Patent [19]
Kalnins et al.

[11] Patent Number: 4,966,703
[45] Date of Patent: Oct. 30, 1990

[54] CYCLONE SEPARATOR

[75] Inventors: Charles M. Kalnins, Malvern; Phillip C. Tuckett, Berwick; Soren R. Z. Hansen, Dandenong, all of Australia

[73] Assignee: Conoco Specialty Products Inc., Houston, Tex.

[21] Appl. No.: 392,969

[22] PCT Filed: Nov. 24, 1988

[86] PCT No.: PCT/AU88/00456
§ 371 Date: Aug. 7, 1989
§ 102(e) Date: Aug. 7, 1989

[87] PCT Pub. No.: WO89/04726
PCT Pub. Date: Jun. 1, 1989

[30] Foreign Application Priority Data
Nov. 24, 1987 [AU] Australia ............... 15571/87

[51] Int. Cl.⁵ .................. B01D 21/26; B01D 19/20
[52] U.S. Cl. .................. 210/512.1; 55/398; 55/448
[58] Field of Search .......... 210/512.1, 512.3; 55/393, 398, 448, 452

[56] References Cited
U.S. PATENT DOCUMENTS

| 2,413,324 | 12/1946 | Holzwarth | 55/452 |
| 2,754,970 | 7/1956 | Ross | 210/512.1 X |
| 3,407,575 | 10/1968 | Krizmann | 55/448 |
| 3,543,485 | 12/1970 | Hardison | 55/398 |
| 4,163,719 | 8/1979 | Macierewicz et al. | 210/512.1 X |
| 4,259,180 | 3/1981 | Surakka et al. | 210/512.1 X |
| 4,832,709 | 5/1989 | Nagyszalanczy | 55/398 X |

FOREIGN PATENT DOCUMENTS
851498 10/1960 United Kingdom .

Primary Examiner—Charles Hart
Attorney, Agent, or Firm—J. E. Holder

[57] ABSTRACT

Cyclone separator having an elongate tapered separating chamber (25) with an axial overflow outlet (34) at the larger diameter end (10a) and an underflow outlet (23) at the smaller diameter end (10b). Inlet to the separating chamber is provided via an axially extending duct (70) which joins the separating chamber at its larger diameter end. The duct is of annular configuration and has a helical flight (90) positioned therewithin.

15 Claims, 8 Drawing Sheets

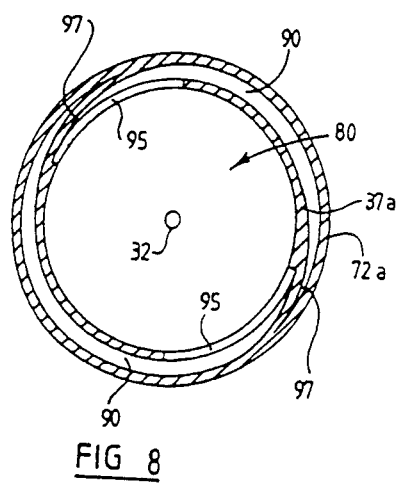

CYCLONE SEPARATOR

This invention relates to a cyclone separator.

Cyclone separators conventionally have inlets at the side thereof for the material to be separated whereby to introduce the material into the cyclone separator with a tangential component of motion. Cyclone separators constructed in accordance with this principle are described in U.S. Pat. No. 4,237,006, Australian patent application No. 84713/79 and International applications No. PCT/AU83/00028 and PCT/AU85/00010. These separators have particular application in the separation of less dense from more dense components in a liquid mixture, particularly in the separation of oil from oily water mixtures.

It is in many cases inconvenient to provide side inlets and it is an object of the invention to provide a construction which permits an axially positioned inlet.

In one aspect, the invention provides a cyclone separator for separating two liquid components one of greater density and the other of lesser density, one from the other, when admitted in admixture to a separating chamber of the separator, the separating chamber being of generally tapered form, tapering from a larger diameter end to a smaller diameter end, and being in the form of an axially extending surface of revolution, the separating chamber having an overflow outlet for the less dense component, located at the larger diameter end, and an underflow outlet at the smaller diameter end, for outflow of the greater density component, and inlet means for inlet of the mixture into the separating chamber at a location at least towards said larger diameter end with a tangential component of motion, characterized in that the inlet means is in the form of an axially extending inlet duct which opens into the separating chamber at said larger diameter end thereof, the inlet duct being provided with flow directing means for axially directing flow into the separating chamber with said tangential component of motion.

The flow directing means may be in the form of one or more baffles, such as helically extending baffles, or may be in the form of vanes or the like fixed to a member which is in use rotated about the axis of the separator to effect inlet of the mixture. In any event the inlet duct may extend in surrounding coaxial relationship with the overflow outlet. The duct may be of annular form of substantially constant outer diameter along its length but having an inner diameter which increases in the direction of inlet flow to the separating chamber. It may also be of helical form.

The invention is further described by way of example only with reference to the accompanying drawings in which:

FIG. 8 is a fragmentary sectional perspective view of the inlet to the cyclone separator of FIG. 5.

Figure 1:
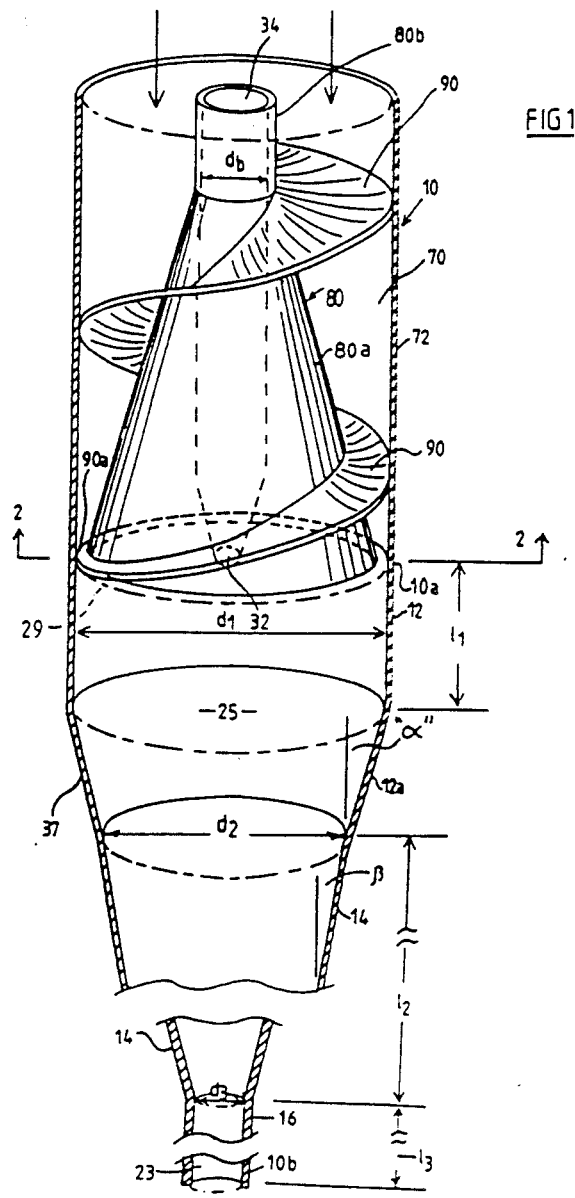
FIG. 1 is a partly sectioned perspective view of a cyclone separator constructed in accordance with the invention.
Figure 2:
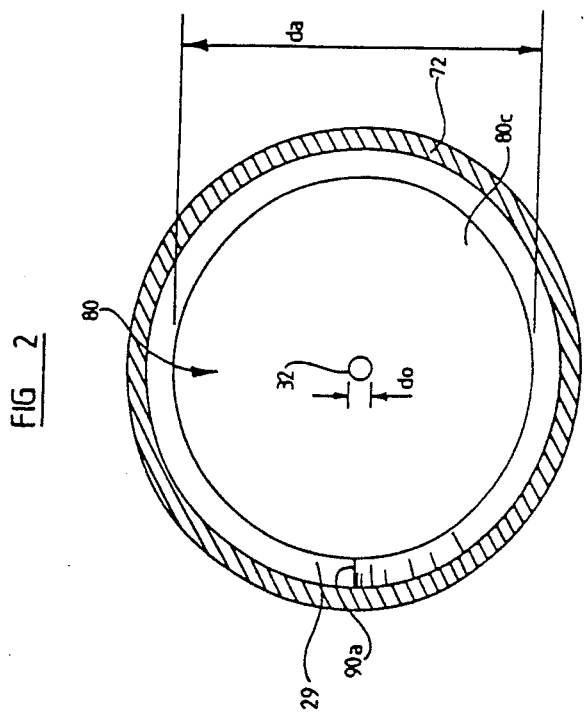
FIG. 2 is a cross-section substantially on the line 2—2 in FIG. 1.
Figure 3:
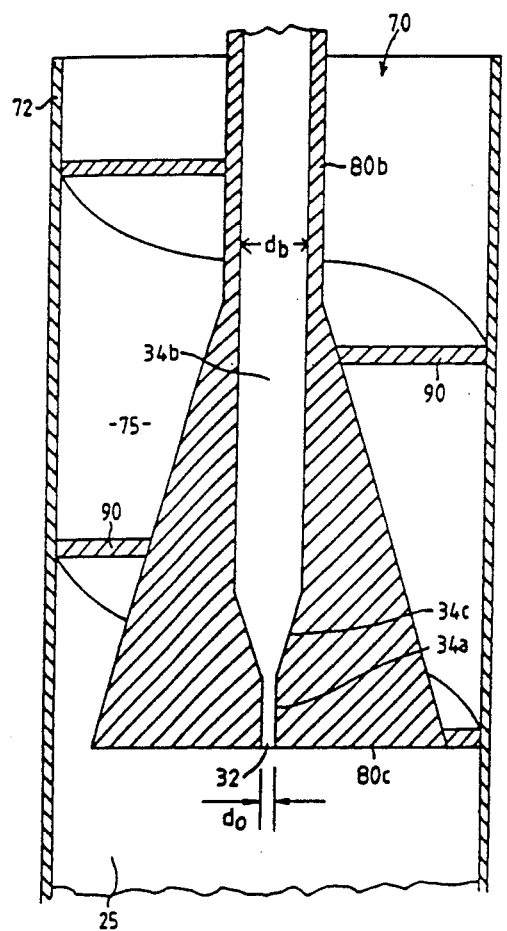
FIG. 3 is an axial cross-section of an inlet duct forming part of the cyclone separator of FIG. 1.

Referring firstly to FIGS. 1 to 3, the cyclone separator shown therein has a separating chamber 25 which has its surface defined as an axially extending surface of revolution in turn defined by the inner surface of an outer casing 37 The separating chamber is of generally tapered form, tapering from a larger diameter end $10a$ to a smaller diameter end $10b$. In this instance, the separating chamber 25 is shown as being formed in accordance with the teachings of the aforementioned U.S. Pat. No. 4,237,006, Australian patent application No. 84713/79 or International application No. PCT/AU83/00028. More particularly, the separating chamber 25 has a first portion 12 of diameter $d_1$ and length $l_1$ this being of generally constant diameter throughout its length, a tapered portion $12a$ of frusto-conical configuration which tapers from diameter $d_1$ to a lesser diameter $d_2$, a second, tapered, portion 14 of length $l_2$, diameter $d_2$ at its larger end and diameter $d_3$ at its smaller end, the second portion 14 leading to a third portion 16 of diameter $d_3$ having a substantially constant diameter throughout its length.

At its larger diameter end, portion 12 leads, in the direction away from portion 14, to an inlet duct 70, defined within a hollow casing 72 of cylindrical form, which casing constitutes a continuation of the casing 37 (where this defines portion 12 of the separator) and having the same diameter thereas. The inner surface of casing 72 defines the outer surface of the duct 70. The inner surface of the duct 70 is defined by the outer surface of a tapered body 80 having frusto-conical body portion $80a$ positioned within the casing 72 and arranged coaxially therewith, with its larger diameter end, having diameter $d_a$, at the end of duct 70 adjacent portion 12 of the separating chamber, and tapering in the direction away from the separating chamber to a diameter $d_b$. As shown, the body 80 further includes a cylindrical end portion $80b$, joining body portion $80a$, at its smaller diameter end, this likewise being coaxial with casing 72.

At its larger diameter end, the body 80 has a transverse face $80c$, (FIGS. 2 and 3) which forms an end face of separating chamber 25, at the larger diameter end thereof. Body 80 also has therewithin an axial overflow outlet 34 in the form of a generally elongate cylindrical duct which opens to the separating chamber 25 via an overflow outlet opening 32 of diameter $d_0$ formed in face $80c$. Between the body 80, at its larger diameter end, and the inner periphery of the separating chamber 12 immediately adjacent thereto, there is defined an annular inlet opening 29.

A baffle, in the form of a helical flight 90, extends for several turns around body 80 and is sealingly secured, at the inner edge thereof, to the outer periphery of the body 80 and, at its outer edge, to the inner periphery of the casing 72. Flight 90 terminates at a transverse edge $90a$, at the larger diameter end of the body 80. As mentioned, the duct 70 is defined at its outer periphery by the inner surface or casing 72, and at its inner periphery by the outer surface of the body 80. In view of the interposition of the flight 90 between these components, the duct 70 further defines a helical inlet passage 75. Likewise, it will be observed that, because of the tapered body 80, the duct 70 which is of annular and generally helical form, decreases in cross-sectional area in the direction towards the separating chamber 25.

In use, liquid mixture to be separated is admitted into the duct 70 and, because of the presence of the flight 90, is caused to execute a helical motion, moving within the passage 75 to the annular inlet opening 29, at which it enters the separating chamber 25 with a component of motion in the axial direction of the separating chamber and with a, further, tangential component.

Aside from the arrangement of the inlet, the separator 10 operates in a similar fashion to the separators described in the aforementioned prior patent specifications. In particular, the mixture travels in helical fashion lengthwise along the separating chamber. The more dense component of the mixture continues this motion to eventually exit chamber 25 via an underflow outlet 23 at end 10b of the separator. The less dense component, however, forms an inner axial core which is driven in the opposite direction to flow to overflow outlet opening 32, passing thereinto and exiting from the separator via the overflow outlet 34.

The separator may be constructed in accordance with the following dimensional constraints $$l_2/d_2 \leq 6, \text{ such as } 6 \leq l_2/d_2 \leq 25$$

$$2 \leq \frac{\pi \times d_1 \times d_2}{4 A_i} \leq 25 \text{ or } 30$$

$$d_0/d_2 \leq 0.25, \text{ such as } d_0/d_2 \leq 0.1 \text{ or } < 0.1$$

$$d_1 > d_2$$

$$d_2 > d_3$$

Where $l_1$, $l_2$, $l_3$, $d_1$, $d_2$, $d_3$ and $d_0$ have the meanings abovementioned, and $A_i$ is the inlet area of the passage 75 at the cross-section where the flight 90 terminates, i.e., at the transverse plane containing edge 90a.

$\beta$, the half angle of the taper of the second portion 14, may be 20' to 3°, such as 1°. Portion 12a is optional. If provided, it may have a half angle, $\alpha$, of 5° °$\alpha$°30° such as 10°.

In accordance with the teachings of International application No. PCT/AU83/00028, a further portion (not shown) may be added to the separating chamber 25 at the end 10b thereof, such as being of frusto-conical form, in order to improve operation of the separator. Furthermore, in accordance with the last-mentioned patent specification, the overflow outlet may be of two part form having a first portion 34a adjacent to and defining opening 32, this being of lesser diameter than a second portion 34b of the overflow outlet which is further from the separating chamber 25. The portions 34a, 34b may be interconnected by a tapered portion 34c. Such a construction is shown, for example, in FIG. 3, the larger diameter portion 34b having a diameter designated $d_2$.

Figure 4:
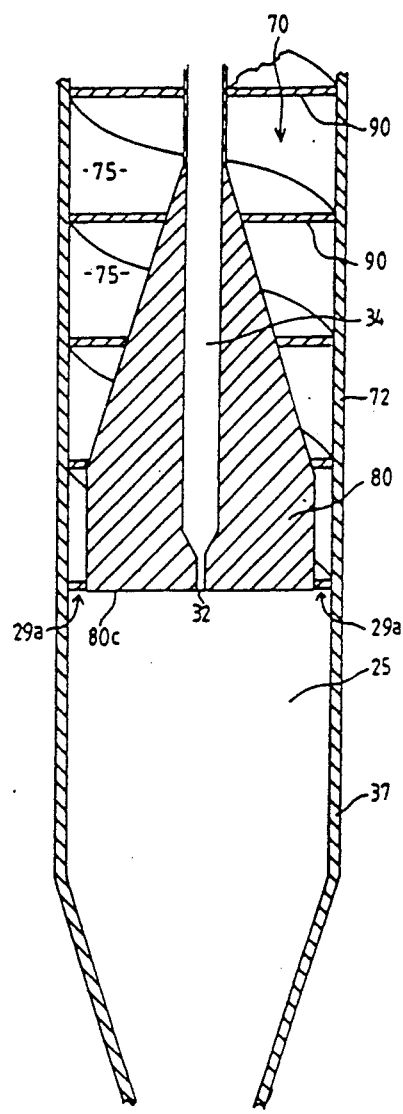
FIGS. 4, 5 and 6 are, respectively, diagrams showing alternative forms of cyclone separator constructed in accordance with the invention.
Figure 5:
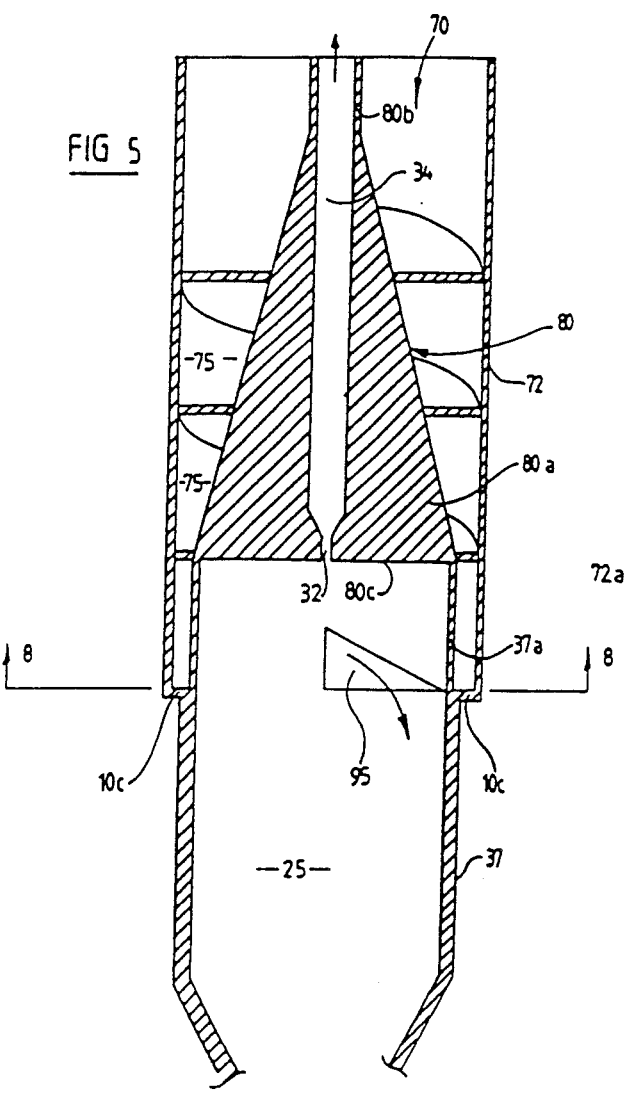

FIGS. 4 and 5 show arrangements similar to that in FIG. 1 and like reference numerals denote like components in each of these FIGURES. Here, however, the separators have two helical flights 90 instead of the single such flight provided in FIGS. 1 to 3. In such a case, there are, formed in duct 70, two inlet passages 75 of helical form, each leading to a separate inlet opening to the separating chamber. In the above mentioned equations, the term $A_i$ is intended to be taken to be a measure of the total inlet area, whether presented by one, two or more passages 75.

The arrangement of FIG. 4 has two inlet openings 29a of "half annular" arcuate form defined at the location where flights 90 end, and between the outer periphery of body 80 and the inner periphery of casing 72a.

The arrangement of FIG. 5, is designed for side entry of the inlet liquid rather than end entry as in the arrangements of FIGS. 1 to 4. More particularly, here, the casing 37 defining separating chamber 25 is made of the same diameter as the largest diameter $d_a$ of the body 80 and joins the body at its largest diameter end. The casing 72 defining ducts 70 is however of larger diameter than the diameter $d_a$ and is extended in the direction towards the underflow outlet of the separating chamber by a further hollow cylindrical end portion 72a which may as shown be of the same diameter as the remainder of casing 72. Casing portion 72a is thus adjacent and concentrically positioned in spaced relationship around an end portion 37a of casing 37 to define an annular space therebetween. The casing portions 37a, 72a are joined by an outwardly stepped wall portion 10c of the separator. The flights 90 are extended for one half of a convolution from body 80 towards the overflow outlet of the separating chamber, in the space between the casing portions 37a, 72a so that the passages 75 are likewise so extended. Inlet ports 95 are provided through the side wall of casing portion 37a to permit inflow of inlet liquid from respective passages 75 into separating chamber 25.

Figure 7:
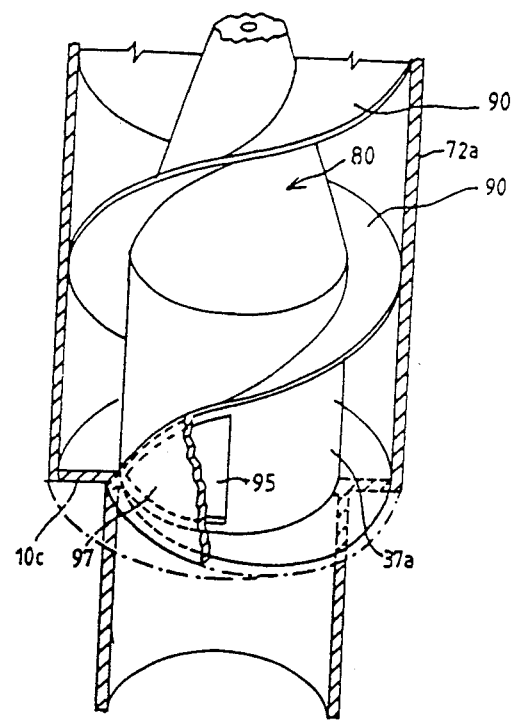
FIG. 7 is a cross-section approximately on the line 7—7 in FIG. 5.

As shown in FIGS. 7 and 8, parts 97 of the side wall of casing portion 72a may be formed of gradually decreasing diameter, as the inlets 95 are approached, to form involute-like inlet duct portions leading to the inlets 95.

Figure 6:
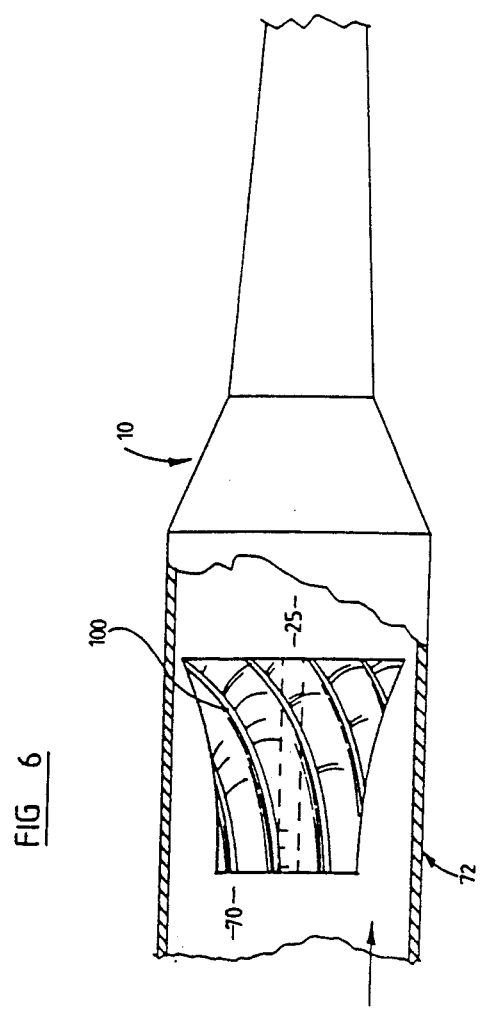

In FIG. 6, the construction is again similar to those previously described. Here, the inlet duct 70 is defined within casing 72, as before, and the body 80 is again provided. However, the or each flight 90 is in this case not affixed to the casing 72, the flights being arranged to be rotatable axially of the duct 70. More particularly, they may, as shown, be formed as involute type blades 100 on the body 80, the body and blades being together rotatable about the axis of the separator. Thus, by providing suitable drive means (not shown) such as a motor drive to rotate the body and blades about the axis of the body, the inlet liquid flowing into separating chamber 25 via duct 70 may have a desired degree of tangential motion imparted thereto. Alternatively, the blades 100 may be formed on another body coaxially rotatable around body 80.

The described constructions have been advanced merely by way of explanation and many modifications may be made thereto without departing from the spirit and scope of the invention as defined in the appended claims.

We claim:

1. A cyclone separator for separating two liquid components one of greater density and the other of lesser density, one from the other, when admitted in admixture to a separating chamber of the separator, the separating chamber being of generally tapered form, tapering from a larger diameter end to a smaller diameter end, and being in the form of an axially extending surface of revolution, the separating chamber having an overflow outlet for the less dense component, located at the larger diameter end, and an underflow outlet at the smaller diameter end, for outflow of the greater density component, and inlet means for inlet of the mixture into the separating chamber at a location at least towards said larger diameter end with a tangential component of motion, characterized in that the inlet means is in the form of an axially extending inlet duct which opens into the separating chamber at said larger diameter end thereof, the inlet duct being provided with flow directing means for axially directing flow into the separating chamber with said tangential component of motion, said inlet means further including a cylindrical portion forming an outer boundary surface within said inlet duct and within which cylindrical portion is coaxially arranged frusto-conically shaped tapered portion for providing an inner boundary surface within said duct, said tapered portion having its larger diameter end at the end of the inlet duct nearest the separating chamber, said large diameter end of said tapered portion being closed except for a small diameter axial passage for providing fluid communication between the separating chamber and the overflow outlet.

2. A cyclone separator as claimed in claim 1 wherein the flow directing means is in the form of a baffle.

3. A cyclone separator as claimed in claim 2 wherein said baffle is helical.

4. A cyclone separator as claimed in claim 3 wherein said baffle is one of a plurality of helical baffles.

5. A cyclone separator as claimed in claim 1 wherein the inlet duct extends to one or more inlet openings in surrounding coaxial relationship with the overflow outlet.

6. A cyclone separator as claimed in claim 1 wherein said duct is of annular transverse section.

7. A cyclone separator as claimed in claim 6 wherein said duct is of substantially constant outer diameter along its length but having an inner frusto-conical wall diameter which increases in the direction of inlet flow to the separating chamber.

8. A cyclone separator as claimed in claim 7 wherein a helical inlet passage is formed in said duct by a helical flight which is positioned in said duct and forms said flow directing means.

9. A cyclone separator as claimed in claim 7 wherein said flow directing means comprises a plurality of helical flights positioned in said duct to define, within the duct, a plurality of helical inlet passages.

10. A cyclone separator as claimed in claim 8 wherein said inlet duct opens to said separating chamber at one or more locations radially spaced from the overflow outlet and at an end wall of the separator in which the overflow outlet opens to the separating chamber.

11. A cyclone separator as claimed in claim 8 wherein the inlet duct opens to the separating chamber via side inlet openings therein.

12. A cyclone separator as claimed in claim 1 wherein said flow directing means comprises an axially rotatable body in the inlet duct and provided with vanes.

13. A cyclone separator as claimed in claim 8 wherein said flow directing means comprises a plurality of helical flights positioned in said duct to define, within the duct, a plurality of helical inlet passages.

14. A cyclone separator as claimed in claim 9 wherein said inlet duct opens to said separating chamber at one or more locations radially spaced from the overflow outlet and at an end wall of the separator in which the overflow outlet opens to the separating chamber.

15. A cyclone separator as claimed in claim 9 wherein the inlet duct opens to the separating chamber via side inlet openings therein.

* * * * *